United States Patent [19]

Stemme et al.

[11] 4,097,133
[45] Jun. 27, 1978

[54] CINEMATOGRAPHIC CAMERA

[75] Inventors: Otto Stemme, Munich; Peter Lermann, Narring; Gabriele Ehgartner, Pullach, all of Germany

[73] Assignee: AGFA-Gevaert AG, Leverkusen, Germany

[21] Appl. No.: 772,970

[22] Filed: Feb. 28, 1977

[30] Foreign Application Priority Data

Mar. 12, 1976 Germany ............................ 2610515

[51] Int. Cl.² ............................................ G03B 17/00
[52] U.S. Cl. .................................... 352/243; 354/81
[58] Field of Search ........................ 352/95, 242, 243; 354/80, 81, 82

[56] References Cited

U.S. PATENT DOCUMENTS 3,240,143  3/1966  Koeber et al. ...................... 352/243
3,599,553  8/1971  Hansen et al. ...................... 352/242

Primary Examiner—Monroe H. Hayes
Attorney, Agent, or Firm—Michael J. Striker

[57] ABSTRACT

A cinematographic camera has a housing composed of a main section which carries at its narrow front side a photographic lens, and a cover section which straddles the main section and is provided with a viewfinder. The main section can be telescoped into and out of the cover section and in so doing respectively blocks and unblocks the viewfinder. A handgrip is pivoted to the main section and can be displaced between a position in which it hugs the main section and overlies the photographic lens which it thereby protects, and a position in which it projects from the main section so that it can be gripped by a user. An arrangement is provided whereby movement of the hand grip to the operating position results in release of the cover section for movement to its operating position and/or the forcible displacement to its operating position; the construction can also be such that it is the movement of the cover section to its operating position which releases the handgrip and/or effects forcible displacement of the same to the operating position thereof.

19 Claims, 6 Drawing Figures

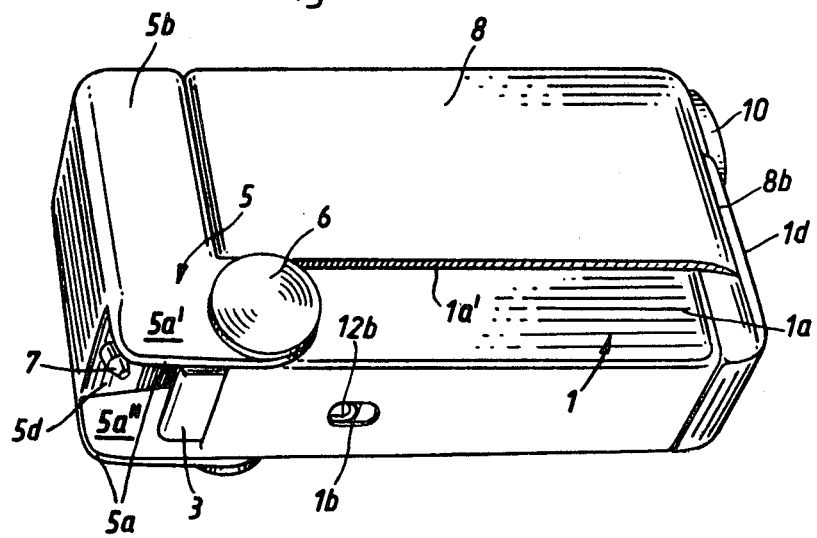
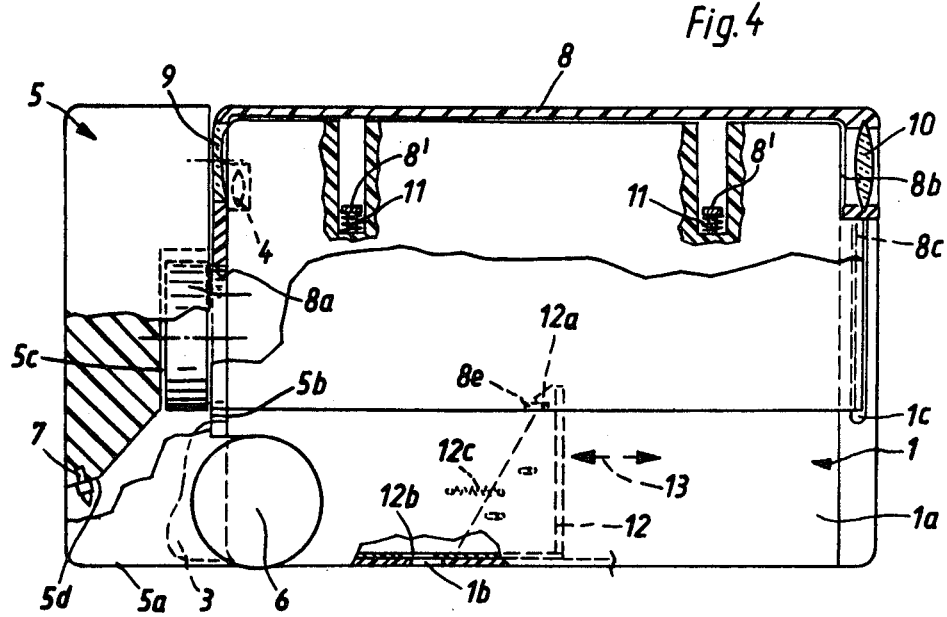

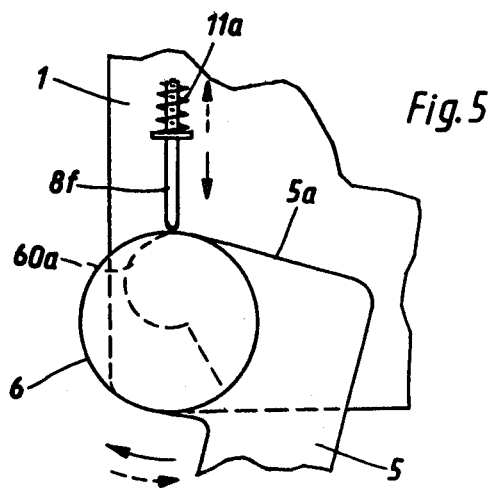
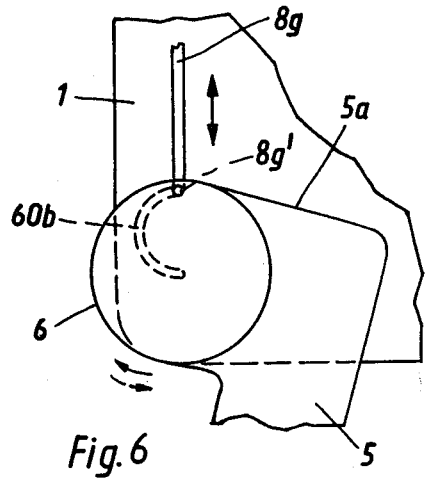

CINEMATOGRAPHIC CAMERA

BACKGROUND OF THE INVENTION

This invention relates to cinematographic cameras, and more particularly — but not exclusively — to cinematographic cameras using amateur film, i.e., 8 mm or Super-8 film.

The trend in cameras of all kinds, including cinematographic cameras, is towards producing smaller and more compact constructions. This is particularly important in cameras intended for amateur use, since it is desired that such cameras be readily portable so that they should be small as well as of light weight.

In keeping with this trend cinematographic cameras have become known which are collapsible so as to require a minimum amount of space when in the inactive (i.e., collapsed) position. Thus, German Gebrauchsmuster GM 7,515,409 has proposed a collapsible camera of this kind wherein a cap is slidably mounted on a camera housing. In the inactive condition of the camera the cap is pushed down over the housing, thereby reducing the overall camera dimensions. To use the camera, the cap is pulled up until components of a view finder mounted on the cap can be pivoted to their operating positions so that the view finder becomes usable.

German Gebrauchsmuster GM 6,929,335 has proposed to pivotably mount a handgrip on the housing of (otherwise not collapsible) camera so that in the inactive position the handgrip can be pivoted snugly against the housing to reduce overall dimensions.

SUMMARY OF THE INVENTION

It is the general object of the present invention to provide further improvements over the prior art.

More particularly, it is an object of the invention to provide a cinematographic camera which is collapsible to very small, compact overall dimensions.

Another object of the invention is to provide a camera of the type in question which is extremely simple to convert from its inoperative to its operative position, and vice versa.

Pursuant to these objects and others which will become apparent hereafter one feature of the invention resides, briefly stated, in a cinematographic camera comprising a collapsible camera housing having a first section provided with a viewfinder and a second section provided with a photographic lens, one of the sections being a movable section mounted for telescoping displacement relative to the other section between a retracted and an extended position in which the viewfinder is respectively blocked and unblocked by the second section; a movable third section forming a handgrip mounted on the camera housing for displacement between a retracted and an extended position in which it respectively hugs and projects outwardly from the camera housing; and means responsive to displacement of one of the movable sections from the retracted position thereof by releasing the other movable section for displacement to its extended position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a perspective view, showing the camera of FIG. 1 in its collapsed position;

FIG. 4 is a side view of the camera in FIG. 3, showing the camera partly sectioned and partly broken away;

FIG. 5 is a fragmentary, diagrammatic view showing a detail of a further embodiment; and FIG. 6 is a fragmentary, diagrammatic view showing a detail of still another embodiment.

DESCRIPTION OF PREFERRED EMBODIMENTS

Figure 1:
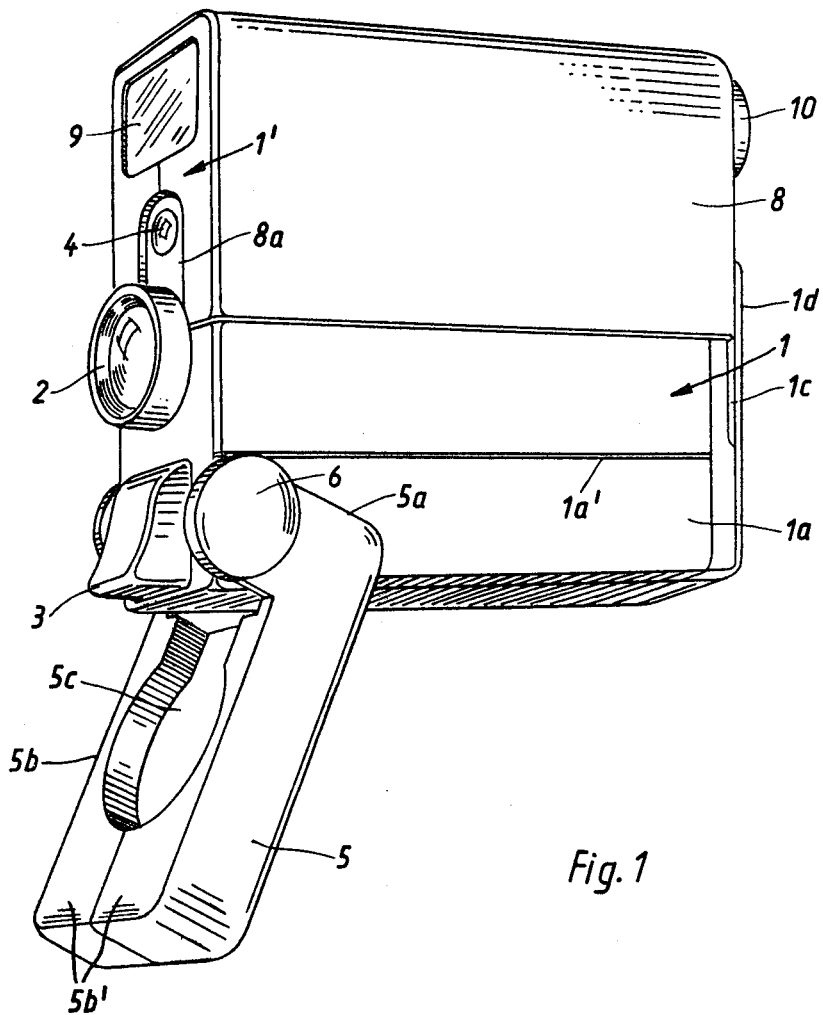
FIG. 1 is a perspective view, showing the novel camera in its operating position.

Discussing the drawing now in detail, and referring first to FIGS. 1–4, it will be seen that these Figures illustrate one embodiment of the invention. FIG. 1 shows the camera in its operating position, i.e., ready for use, whereas FIG. 3 shows it in its collapsed position, i.e., ready for transport and/or storage.

The cinematographic camera in FIGS. 1–4 has a camera housing composed of two sections 1 and 8. The section 1 is the actual housing which accommodates the camera mechanism (not shown because it is known per se and not part of the invention) and a film chamber (also not shown) for film magazines or film cassettes. Section 1 is provided at its narrow front side 1' with a photographic lens 2, a trigger 3 and a port or window 4 through which light can reach a photoelectric sensor (located behind port 4) which controls the diaphragm setting in dependence upon the available light. It should be understood that the sensor and its control of the diaphragm setting are not a part of the invention and are therefore not illustrated.

A handgrip 5 is pivotably mounted at the lower front edge of housing section 1 so that it can pivot about the axis of pivot 6 between the position of FIG. 1 and the position of FIG. 3. The grip 5 is substantially L-shaped and composed of a (shorter) bifurcated portion 5a and a (longer) portion 5b which is to be gripped by a user. When grip 5 is in the retracted (non-operative) position shown in FIG. 3, the portion 5b overlies the front side 1'. In the illustrated embodiment the surface 5b' of portion 5, which faces the front side 1' in the retracted position, is coextensive with this front side; however, it could be smaller or larger. What is important is that section 5b be able to protect the components located at the front side 1', especially the lens 2 and the trigger 3, so that the camera can be safely carried and stored without the need for a protective casing, pouch or the like. To facilitate this desired protection, and to permit the portion 5b to hug the section 1 as closely as possible, surface 5b' is provided with a recess 5c into which lens 5 and trigger 3 enter when the grip 5 is in the position shown in FIG. 3. It is self-evident that separate recesses could be provided for the lens and the trigger, respectively.

As indicated before the portion 5a is bifurcated, or rather bifurcated in part (see FIG. 3) so that its two lateral arms 5a' and 5a" straddle the section 1 at opposite lateral sides of the same in both pivoted positions of the grip 5, thereby assuring that the grip is held firmly against transverse wobbling. A bight or transverse part 5d connects the arms 5a', 5a" as most clearly seen in FIG. 3.

Upwardly of the portion 1a of housing section 1 the lateral surfaces (one shown) of section 1 are recessed inwardly, in direction towards one another along the edge 1a'. The upright rear edges of the section 1 are provided with upright grooves 1c (one shown). Housing section 8 is a substantially sleeve-shaped cover or jacket which is pushed from above over the section 1 and is provided with upright ribs 8c (one shown) which are slidably received in the grooves 1c. To provide a neat, compact structure the transverse outer dimensions of the section 8 are advantageously so chosen that in the collapsed position (FIG. 3) the outer lateral surfaces of section 8 are flush with the surfaces of portion 1a of section 1; the lower edges of these lateral surfaces extend in this position to the edge or step 1a' as shown. The front side of section 8 is provided with a cut-out 8a (FIG. 1) so as to permit movement of the section 8 to the collapsed position (FIGS. 3 and 4) despite the presence of lens 2. The rear side of section 8 is formed with another cut-out 8b (FIGS. 2, 4) through which the rear portion of section 1 is exposed.

Figure 2:
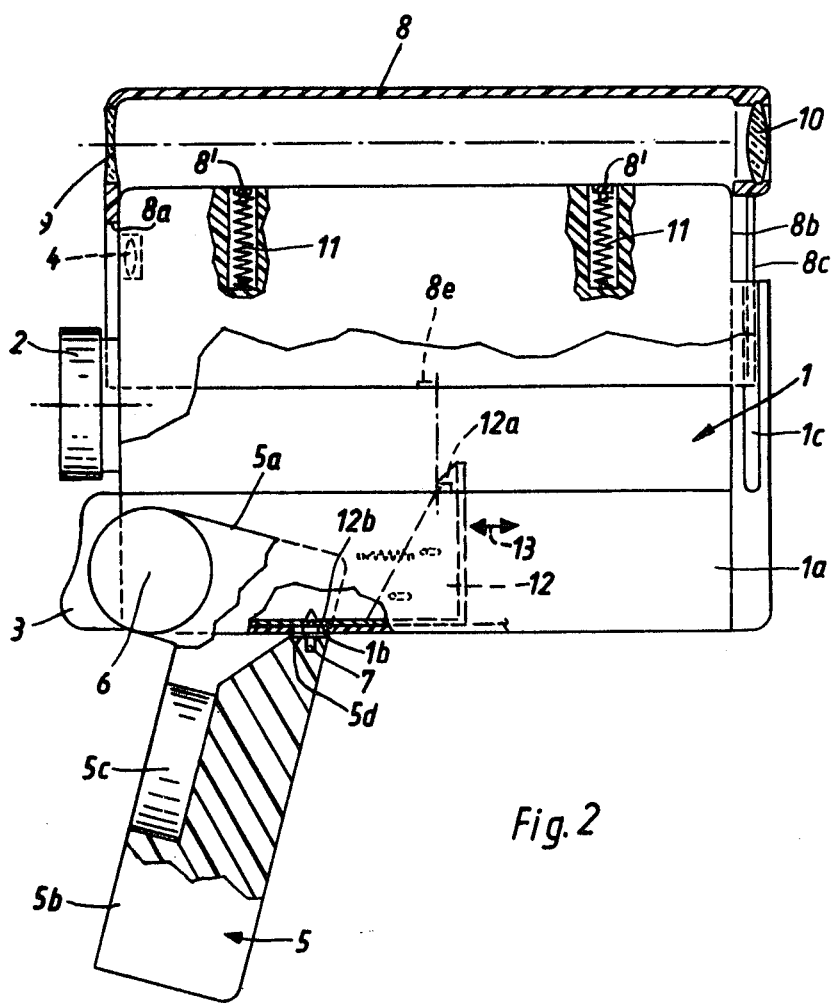
FIG. 2 is a side view of the camera in FIG. 1, showing the camera partly sectioned and partly broken away.

The upper part of section 8 is provided with a viewfinder having a window 9 in the front side of the section and a viewfinder lens 10 in the rear side thereof (FIGS. 1, 2, 4). When the sections 1, 8 are telescoped-together to the collapsed position of FIG. 3, the viewfinder is blocked by the fact that an upper portion of section 1 enters into the upper part of section 8 and becomes located intermediate window 9 and the lens 10. For the viewfinder to be unblocked and hence usable the section 8 must be in its operating position (FIGS. 1, 2), i.e., the sections 1 and 8 must be telescoped apart. To facilitate placing the camera in operative position the section 8 is subjected to a permanent biasing action tending to move it to its operating position.

In the illustrated embodiment the biasing action is exerted by two springs 11 (however, one or more than two could be used). Preferably, these are expansion springs which react against the section 1 and the section 8 (FIGS. 2 and 4) to which latter they are connected in suitable manner, for example as shown by means of lugs or other projections 8' extending inwardly from the side walls of the section 8. However, those skilled in the art will realize that contraction springs could also be used which would be mounted in such a manner as to pull the section 8 from the position in FIGS. 3, 4 to the position in FIGS. 1, 2.

Since springs 11 permanently tend to move section 8 to the operating position, the section 8 must be arrested against such displacement when it is to remain in the collapsed position of FIGS. 3, 4. One way of doing this is illustrated in FIGS. 2 and 4 which show that within the section 1 there is mounted a bracket 12 which can slide in the direction of the double-headed arrow 13. The bottom wall of section 1 is provided with an opening 1b and the horizontal arm of the (angled) bracket 12 is provided with an aperture 12b which partially overlaps the opening 1b (see FIG. 4) when the bracket is in its leftmost position; the bracket is urged to this position by a spring 12c which is connected to the bracket 12 and the section 1, respectively and resists rightward movement of the bracket. In the left-most (arresting) position a nose or other suitable portion 12a of the upright arm of bracket 12 engages with a detent projection 8e (e.g. a lug) projecting inwardly from a sidewall of section 8, so that the section 8 is thereby held in the retracted or collapsed position of FIGS. 3 and 4.

According to the present invention it is desired that there be an interdependence between the section 8 and the grip 5, such that the movement of only one of them towards its operating position is sufficient to release the other for similar movement to the operating position thereof, or to actually enforce such movement.

In the embodiment of FIGS. 1–4 this interdependence is achieved by providing the bight 5d with a pin 7 (FIG. 3) which projects from it and has a conically shaped tip. The pin 7 is so positioned that when grip 5 is pivoted from the collapsed position of FIG. 3 to the operating position of FIG. 1, the tip of pin 7 will enter into the opening 1b and that portion of aperture 12b which overlaps the opening. Due to the only partial registry and due to the conicity of the tip of pin 7, the entry of the tip forces the bracket 12 to shift to the right (FIGS. 2 and 4) so that portion 12a disengages detent 8e, thus permitting the springs 11 to telescope the sections 1, 8 apart to assume the position in FIGS. 1, 2. Hence, the camera is automatically placed into its operating position, and the viewfinder made ready for use, whenever the grip 5 is pivoted to its operating position. In the operating position of grip 5 the pin 7 also serves to fix this position, i.e., it locates the grip 5 in the proper operating position.

The springs 11, bracket 12 and all other components having to do with the purposes of the present invention must of course be laterally located in sections 1 and 8, in such a manner that there remains within section 1 a film chamber into which a film cassette or the like can be inserted. Access to this chamber can be had by making the rear portion 1d of section 1 a pivotable or detachable cover (not shown) which can be pivoted or removed through the cut-out 8b of section 8.

If desired for reasons of compactness and/or appearance, the transverse thickness of grip 5. (i.e., the distance between the outwardly directed surfaces of its arms 5a', 5a") can be made equal to the distance between the outwardly directed lateral faces of the section 8, so as to be flush with these faces. However, the distance could also be greater. The first-mentioned solution has the advantage that when the grip 5 is in the position of FIG. 3, it will be no wider than (and hence will not project transversely beyond) the sections 1,8.

Details or two other embodiments are shown in FIGS. 5 and 6. It should be understood that except for the specific differences shown and/or described with reference to FIGS. 5 and 6, these embodiments will be otherwise identical with the one in FIGS. 1–4.

In FIG. 5 the pivot 60 which pivotably mounts the grip 5 is provided (integrally or otherwise) with a cam 60a which turns with the pivot 60 when the grip 5 is moved between its two end positions. Of the section 8, FIG. 5 shows only a portion 8f (e.g., an arm, a projection or the like) which has its free end in tracking engagement with the cam 60a so as to constitute a follower. A spring 11a in this case acts between the section 1 (e.g., by bearing upon a not-illustrated lug of the same) and upon a shoulder or flange (see FIG. 5) of the portion 8f; if the portion is essentially rod-shaped, the spring 11a may surround it as shown.

In this embodiment the section 8 is, of course, being permanently urged to its retracted position (FIG. 3) by the spring or springs 11a. Therefore, when the grip is moved to its inoperative position (FIG. 3) the section 8 is also automatically retracted since the portion 8f follows the contour of cam 60a (see FIG. 5). Conversely, due to this contour the section 8 is raised to its operating position via the portion 8f when the cam 60a turns in the opposite direction due to pivoting of the grip 5 to its extended or operating position which is shown in FIG. 1.

FIG. 6 shows that the spring-loaded arrangement of FIG. 5 can be replaced with an arrangement wherein the cam 60b (which corresponds to cam 60a) is formed with a cam groove. The portion 8g (corresponding to portion 8f) of section 8 is provided at its free end with a projection 8g' which is slidably received in the cam groove 60b. The groove 60b may be undercut and the projection 8g' engage beneath the undercut sides of the groove, so that the projection cannot unintentionally become disengaged from the groove.

In this embodiment the section 8 is automatically extended as the grip 5 is moved from inoperative to operative positions, since the projections 8g' will slide in the groove 60b and push the section 8 to extended position via the portion 8g. Conversely, pivoting of grip 5 from operative to inoperative position automatically retracts the section 8.

The invention as disclosed herein is susceptible of various modifications. For example, instead of using the pivoting of grip 5 to control the movement of section 8 the reverse arrangement would be possible, wherein the movements of section 8 would be employed to control the pivoting of grip 5. The motion-transmitting and control mechanisms used for this purpose could operate in the same way as those described hereinbefore. The grip 5 could also be spring-loaded, i.e., a strong spring could permanently bias it to its operating position. It would then require a latching arrangement for holding it in the inoperative position and upon release of the latching arrangement would be automatically moved to its operating position by the biasing spring; in so moving it could then control the section 8 in one of the ways described above. A joint movement of grip 5 and section 8, under the influence of a spring or motion-transmitting linkage or other mechanism, would also be possible. Similarly, the section 8 need not straddle the upper side of the section 1, but could instead straddle the lower side thereof and still be operated in the various ways described herein; it would then be the lower portion of section 1 which would block the viewfinder when the sections 1 and 8 are telescoped together. The grip might then have to be relocated to a different position, however.

It will be understood that each of the elements described above, or two or more together, may also find a useful application in other types of cinematographic cameras differing from the types described above.

While the invention has been illustrated and described as embodied in a cinematographic camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cinematographic camera, comprising a collapsible camera housing having a first section provided with a viewfinder and a second section provided with a photographic lens, one of said sections being a movable section mounted for telescoping displacement relative to the other section between a retracted and an extended position in which said viewfinder is respectively blocked and unblocked by said second section; a movable third section forming a handgrip mounted on said camera housing for displacement between a retracted and an extended position in which it respectively hugs and projects outwardly from said camera housing; and means responsive to displacement of one of said movable sections from the retracted position thereof by releasing the other movable section for displacement to its extended position.

2. A camera as defined in claim 1, wherein said one movable section is said first section and is configurated as a sleeve embracing said second section.

3. A camera as defined in claim 1, wherein said third section has a portion which overlies said lens when said third section is in said retracted position thereof.

4. A camera as defined in claim 1, wherein said second section has a front on which said lens is provided; said third section having a portion which overlies and is substantially coextensive with said front face when said third section is in said retracted position thereof.

5. A camera as defined in claim 1; and further comprising means mounting said third section for pivotal displacement between said retracted and extended positions thereof.

6. A camera as defined in claim 1; and further comprising means permanently tending to bias said one movable section to said extended position thereof.

7. A camera as defined in claim 1, wherein said one movable section is said first section and is configurated as a sleeve embracing said second section; and further comprising at least one spring reacting between said first and second sections and permanently tending to bias said one movable section to said extended position thereof.

8. A camera as defined in claim 1; further comprising means permanently tending to bias said one movable section to said extended position thereof; and wherein the first-mentioned means comprises a disengageable detent arrangement for latching said one movable section in said retracted position thereof.

9. A camera as defined in claim 8, said detent arrangement comprising a component shiftable between a latching position and an unlatching position, and wherein said first-mentioned means further comprise an element engageable with said component for shifting the same to said unlatching position in response to displacement of said third section to said extended position thereof.

10. A camera as defined in claim 9, wherein said second section is provided with an opening and said component has an aperture which in part overlaps said opening when said component is in said latching position, said element being provided on said third section movable therewith and having a tapered portion which enters into said opening and aperture and shifts said component to said unlatching position during displacement of said third section to said extended position thereof.

11. A camera as defined in claim 11, wherein said detent arrangement comprises a biasing element permanently tending to bias said component to said latching position thereof.

12. A camera as defined in claim 1, said third section having a surface portion which overlies said lens when said third section is in said retracted position thereof, and wherein said surface portion is provided with a recess into which said lens enters.

13. A camera as defined in claim 1, said second section having a front side provided with said lens and at least one other component projecting beyond said front side; and wherein said third section has a surface which overlies said front side when said third section is in said retracted position thereof and which is provided with at least one recess for said lens and other component.

14. A camera as defined in claim 1, said second section having a front side provided with said lens and a rear side provided with a cover which affords access to a film chamber; and wherein said first section is provided with a cut-out which exposes said cover.

15. A camera as defined in claim 1, said third section comprising a handgrip member and a pivot member mounting said handgrip member on said second section and being turnable with said handgrip member; and wherein said means comprises a cam turnable with said pivot member and a follower portion of said first section in tracking engagement with said cam.

16. A camera as defined in claim 1, said third section comprising a handgrip member and a pivot member mounting said handgrip member on said second section and being turnable with said handgrip member; and wherein said means comprises a cam groove in said pivot member and a follower portion of said first section linked to and guided for movement within said cam groove.

17. A camera as defined in claim 1, wherein said third section comprises a handgrip member having a bifurcated first part pivoted to said second section, and a second part extending at an angle from said first part and adapted to be gripped by a user.

18. A camera as defined in claim 17, wherein said second section has a front face provided with said lens, a rear face and two parallel lateral faces each extending between said front and rear faces, said bifurcated first part having two arms which are transversely spaced from one another by a distance which is at least equal to the spacing between said lateral faces.

19. A camera as defined in claim 1, wherein said second section has a front face provided with said lens and two lateral faces each composed of a first face portion and a second face portion recessed inwardly of said first face portion in direction towards the respectively other lateral face, said first section being a sleeve which straddles said lateral faces and has two side surfaces each of which is flush with one of said first face portions when said one movable section is in said retracted position thereof.

* * * * *